Figure 1:
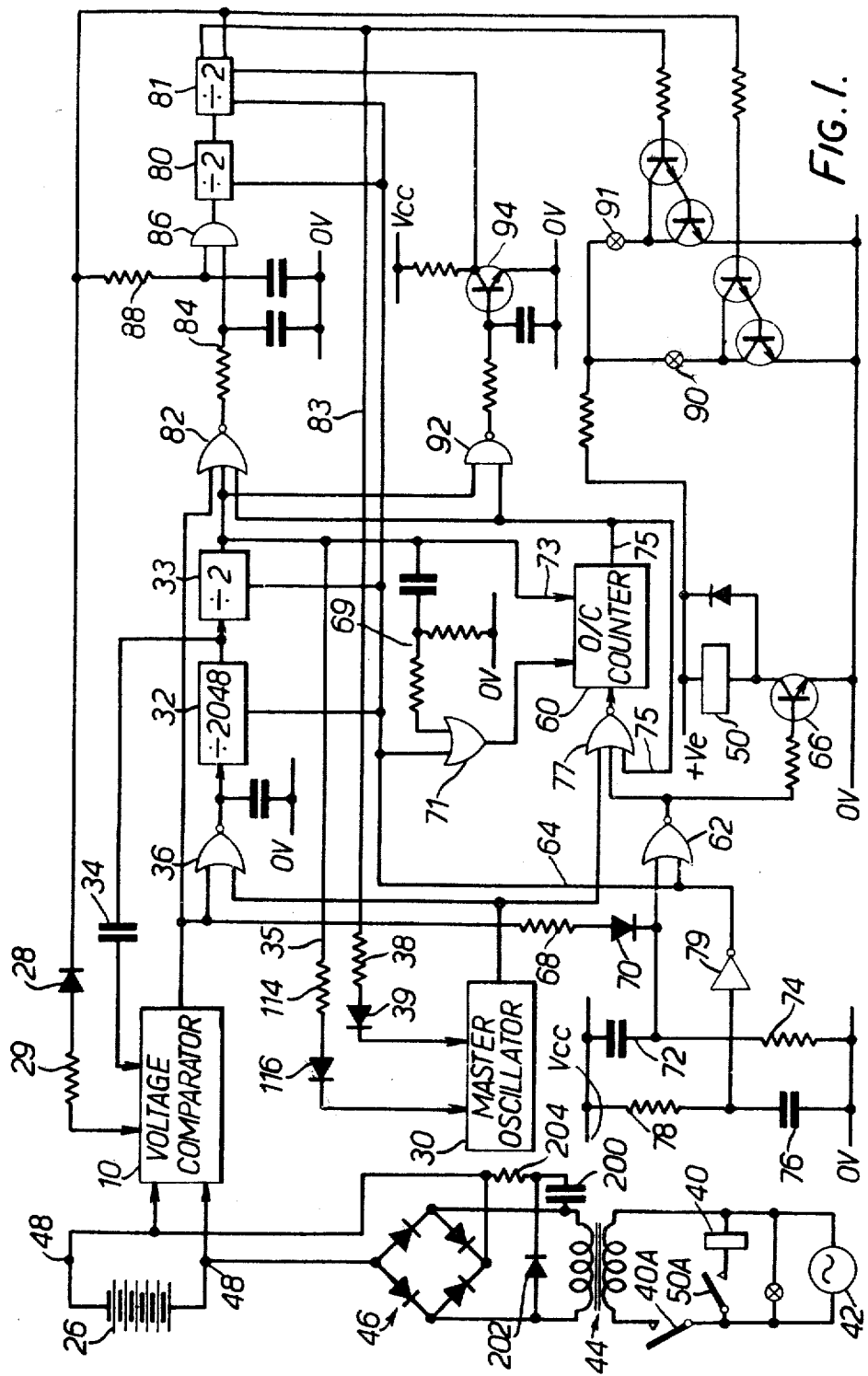

United States Patent
Foster et al.

[11] 3,895,282
[45] July 15, 1975

[54] ELECTRIC CIRCUITS PARTICULARLY FOR AUTOMATIC BATTERY CHARGING APPARATUS

[75] Inventors: George William Foster, Bolton; Dennis Albert Clayton, Gawsworth, both of England

[73] Assignee: Electric Power Storage Limited, London, England

[22] Filed: Dec. 26, 1973

[21] Appl. No.: 427,551

[52] U.S. Cl. .................. 320/20; 320/21; 320/37; 320/39
[51] Int. Cl.² ...................................... H02J 7/10
[58] Field of Search .................. 320/20, 39, 40, 21

[56] References Cited
UNITED STATES PATENTS
3,761,795  9/1973  Clayton et al. ................ 320/39 X
3,800,208  3/1974  Macharg ........................ 320/39 X

*Primary Examiner*—J. D. Miller
*Assistant Examiner*—Robert J. Hickey
*Attorney, Agent, or Firm*—Watson, Cole, Grindle and Watson

[57] ABSTRACT

Automatic battery charging apparatus is arranged to test the battery voltage at intervals of about 15 minutes, and to continue charging only if the voltage is below 2.3 volts per cell. If the voltage is higher, charging is suspended until the voltage has fallen to 2.3 volts per cell. The time needed for this fall to occur is monitored, and when on two occasions a comparison has indicated that a fall time is less than 5 percent greater than the preceding fall time, the main phase of the charge is terminated and a topping-up phase started. The apparatus is also arranged to stop charging if the battery voltage rises to 3.6 volts per cell, and a voltage doubler is arranged to raise the terminal voltage to this level if the battery is removed, so turning off the charge.

14 Claims, 4 Drawing Figures

ELECTRIC CIRCUITS PARTICULARLY FOR AUTOMATIC BATTERY CHARGING APPARATUS

This invention relates to electric circuits, particularly for automatic battery charging apparatus.

One aspect of the invention is concerned with automatic battery charging apparatus and is in some respects an improvement in or modification of those arrangements set forth in the present applicants British Pat. Specification No. 1,233,186 and U.S. Pat. No. 3,761,795.

That specification describes and claims automatic electric battery charging apparatus including means for temporarily interrupting the charging current for periods, which may be referred to as open-circuit intervals, the duration of each of which depends on the fall of battery voltage during the open-circuit interval, and means for finally interrupting or modifying the charging circuit to terminate the charge, or a phase of the charge, when the ratio of the duration of an open-circuit interval to that of a preceding open-circuit interval is below a predetermined value.

Thus according to one aspect of the present invention in such apparatus the means for terminating a phase of the charge does so only when the ratio of the duration of an open-circuit interval to that of a preceding open-circuit interval is below a predetermined value in respect of more than one pair of successive open-circuit intervals.

This not only provides for the possibility that occasionally the behaviour of a battery may be anomalous and may give a signal to terminate the main phase of the charge too soon, but in addition it may be desirable to continue the charge in order to ensure mixing of the electrolyte to a desirable extent.

In one form of the invention means are included for supplying pulses at one frequency and at a slightly lower frequency respectively during odd and even successive open-circuit intervals, and at least one semiconductor binary digital counter for comparing the number of pulses in the respective intervals and terminating the charge or a phase of it if the number in the even interval falls short of that in the odd interval. A single counter may be employed for both odd and even open-circuit intervals. Moreover the duration of the charging periods between the open-circuit intervals may be determined by a charge time counter supplied with pulses from the same source as the open-circuit interval counter. The number of occasions on which the ratio of the duration of an open-circuit interval to that of a preceding open-circuit interval is below a predetermined value may be registered by a further semiconductor binary digital counter.

In order to monitor when the battery voltage falls below a given value, various forms of trigger circuit could be employed. For the major part of the charge however, for example 6 or 8 hours, representing 70 to 80 percent of the charge, the battery voltage may be below the desired datum value (for example 2.3 volts per cell in the case of a lead acid battery) even while being continuously charged. Thus if the charging current is switched off after a charging interval of predetermined duration (for example about a quarter of an hour) it will cause momentary operation of the contactor at such intervals throughout the charge. To avoid this, in one form of the invention a timer counter delivers a momentary pulse to a trigger circuit which serves in effect to lower its operating threshold momentarily, so as to switch it to the open-circuit state as it would if the battery voltage exceeded a datum value, but almost immediately to restore it so that if the battery voltage is already below the datum value, the trigger circuit will revert to its charging state. The operating time of the trigger circuit is made substantially faster than that of the circuits it controls to operate the contactor so that the latter does not respond in the time taken by the trigger circuit to change state and revert to its previous state.

Such a level-responsive circuit, in which an output assumes one state when a controlling quantity exceeds a datum value and another state when it falls short of the same value is not confined to the charging apparatus set forth above.

Thus according to a further aspect of the invention a level-responsive circuit in which the controlling quantity is applied to the input of a trigger circuit having a stable range so as to assume one state when the control quantity rises above the top of the range and the other when it falls below the bottom of the range, includes means for applying pulses to the trigger circuit so as to change it over momentarily to one state if it is not already in that state so that it will remain in that state if the controlling quantity is within the stable range, but revert to its previous state if the controlling quantity is outside the range in one direction. The operating time of the trigger circuit may then be made substantially faster than that of an output circuit controlled by it, so that the latter does not respond in the time taken by the trigger circuit to change state and revert to its previous state.

The form of trigger circuit or voltage comparator may vary but one form of voltage comparator may be employed which is not limited to the particular application for the charging circuit.

Thus according to a further aspect of the invention a voltage comparator for assuming one state when an input voltage exceeds a higher threshold value and another state when it falls below a lower threshold value, includes a differential operational amplifier having a resistive feedback path including a series diode so that feedback current can flow in only one direction and variation of the feedback resistor will adjust only one of the said threshold values.

A further aspect of the invention is concerned with means for causing the charging apparatus to be switched off when the battery is disconnected. Various arrangements have in the past been adopted for this purpose and an object of this aspect of the invention is to provide a simple and convenient arrangement that is nonetheless effective. Thus according to this aspect of the invention automatic battery charging apparatus includes a main rectifier having its input connected to an a.c. supply and its output connected to charger terminals to which a battery is connected to be charged, voltage responsive means for switching off the supply to the rectifier when the voltage between the charger terminals exceeds a predetermined value, and a voltage doubler circuit connected to the input of the main rectifier and through an impedance to the battery terminals to produce across the latter an increased voltage and switch off the supply when the battery is disconnected. Conveniently the voltage doubler comprises a diode and a capacitor connected in series across the main rectifier input, and having their junction connected through a resistor to one of the charging terminals.

Figure 2:
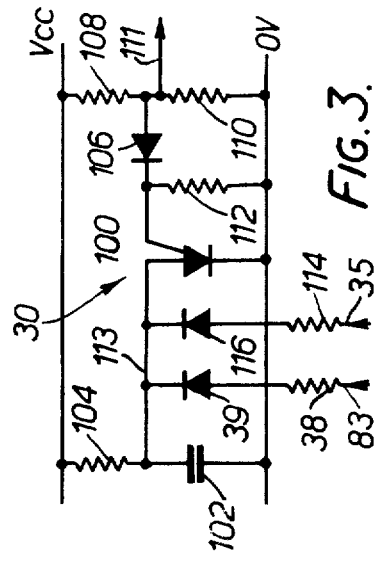
Figure 3:
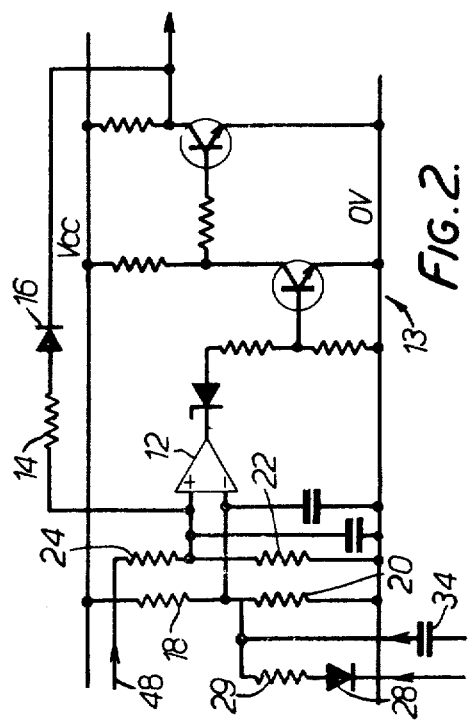
Figure 4:
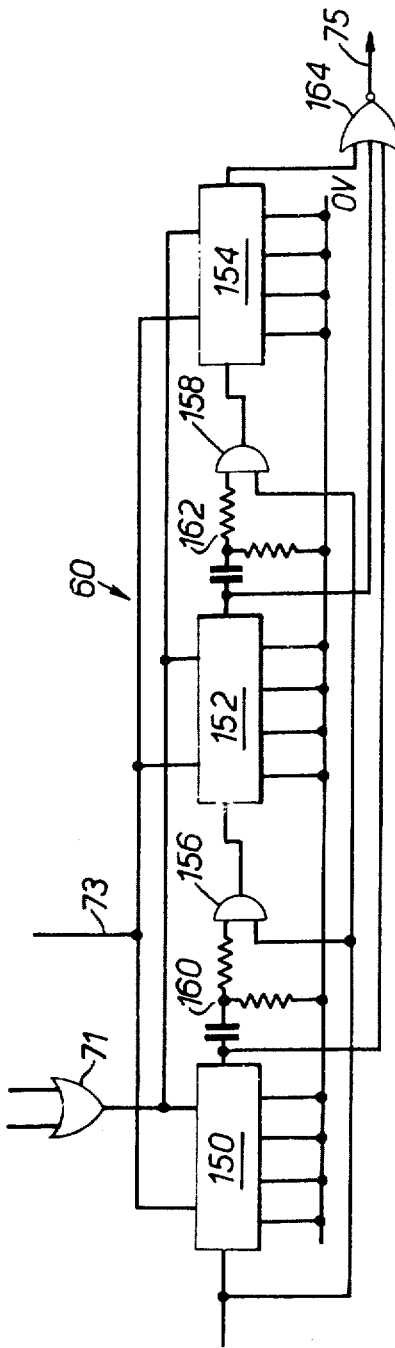

The invention may be put into practice in various ways but one specific embodiment will be described by way of example, with reference to the accompanying drawings, of which:

FIG. 1 is a block circuit diagram of an automatic charging apparatus for charging lead-acid batteries and automatically terminating the main phase of the charge when the battery is fully charged; and FIGS. 2, 3 and 4 are more detailed circuit diagrams of certain parts of the apparatus of FIG. 1.

The charging apparatus includes a contactor 40 having main contacts 40A connected in series between an a.c. supply 42 and the primary winding of a charger transformer 44 of which the secondary winding is connected to a main bridge rectifier 46 whose output is connected directly to charging terminals 48 to which a battery 26 is connected for charging. The contactor coil is connected across the same supply 42 through a normally-open contact 50A of a relay 50.

The power supply for the operation of the control circuits of the charger, with the exception of the relay 50 and certain indicator circuits, is derived from the battery 26 through a stabilised power supply unit (not shown). The supply for the relay 50 and the indicators is derived from the a.c. supply 42.

The charging apparatus is so arranged that when a discharged battery 26 is connected to the charging terminals 48, the battery is brought back to a fully charged state in a main phase of the charge. The main phase is referred to as phase 2. When the battery 26 is fully charged, the charging apparatus switches over to a topping up phase referred to as phase 3, in which the charging current is switched on at relatively long intervals for relatively short periods, a regime that can be continued more or less indefinitely without damage to the battery.

As in the prior specification referred to above the charger includes an arrangement for switching off the charging current for periods that will be referred to as "open circuit intervals", and then switching it on again at the end of each open circuit interval under control of a battery voltage comparator 10 which compares the battery voltage with a reference voltage, and, when the battery voltage falls below a given value, causes the charging current to be switched on again. In addition a counter 60 is provided for counting clock pulses upwards during each odd open-circuit interval in order to obtain a measure of the length of the interval, and then counting pulses downwards during the ensuing even open-circuit interval, the pulses being at a slightly lower frequency, say 5 percent lower, during the even open-circuit intervals, and terminating the main phase of the charge if the open circuit pulse counter 60 has not returned to 0 before the battery voltage has dropped to its predetermined value and terminated the even open-circuit interval. The charging apparatus also includes what may be termed a double-chance counter 80, 81 to ensure that the main phase of the charge is only terminated when the difference between two consecutive open-circuit intervals has been less than 5 percent on two occasions.

The voltage comparator 10 is shown in detail in FIG. 2 and comprises a differential operational amplifier 12 driving a two-stage d.c. coupled transistor amplifier 13. A feed-back resistor 14 in series with a diode 16 allows current to flow from the non-inverting input of the amplifier 12 to the output of the amplifier 13 but not in the opposite direction. The amplifier 12 is fed from the stabilised voltage supply and the inverting input is connected to the tapping of a potential divider 18, 20 connected across that supply. The non-inverting input is connected to the tapping of a potential divider comprising what will be termed a drain-resistor 22 having its other end connected to earth and to the negative battery terminal, and an adjustable resistor 24 connected to the positive terminal 48 of the battery 26 and adjustable in accordance with the number of cells of the battery.

Accordingly when the battery voltage is above a predetermined value the amplifier 13 will give a high output and the diode 16 in the feed-back will prevent the flow of any feed-back current. The adjustment is such that under these conditions the predetermined voltage will correspond in the case of a lead acid battery to 2.3 volts per cell. Accordingly if the battery voltage is above 2.3 volts per cell and is gradually decreasing, the amplifier will switch off when the battery voltage falls to 2.3 volts per cell. Thereupon the amplifier output will become low and feedback current will flow from the input to the output thereby in effect placing the feed-back resistor 14 in parallel with the drain-resistor 22 and altering the ratio of the input potential divider so that a higher voltage, perhaps 3.6 volts per cell, is required to switch the amplifier 13 on again.

It will however be appreciated that an alternative way of switching the amplifier on again is to reduce the reference voltage applied to the inverting input of the amplifier, and this is in fact done under the control of a charge period timer comprising a master oscillator 30 feeding a charge period counter 32. When the latter has counted a predetermined number of pulses (corresponding to a period of perhaps a quarter of an hour) it delivers a negative pulse through a capacitor 34 to the inverting input of the amplifier 12 which virtually reduces the reference voltage of the amplifier to zero so that quite a low battery voltage will switch the amplifier on for a very short time.

This immediately restores the threshold voltage to 2.3 volts per cell, so that if the battery voltage is above this value the amplifier 13 will remain switched on after the end of a pulse, and this will switch off the charging current. If on the other hand even at the end of a charging period the battery voltage is still below 2.3 volts per cell the amplifier 13 will immediately switch off again at the end of the short pulse and the time during which it is switched on will have been insufficient to interrupt the charging circuit.

Thus in the early and major part of the charge, perhaps 6 to 8 hours, up to the time when the battery 26 is 70 to 80 percent fully charged, the voltage will still be below 2.3 volts on open circuit even at the end of a charging period of about a quarter of an hour, and in these circumstances the amplifier 13 will immediately switch off at the end of the pulse before the contactor 40 has had time to open and the charge will be continued without interruption. On the other hand in the final stages of the charge, when the battery voltage is above this value, open circuit intervals will be introduced and the duration of these will increase rapidly at first and then more slowly as the battery 26 becomes more and more nearly fully charged and takes longer and longer for its voltage to fall to the threshold value of 2.3 volts per cell. When the battery is fully charged successive open-circuit intervals will be of equal duration.

The inclusion of the diode 16 in the feed-back circuit enables the voltage switching threshold during open circuit to be accurately defined without being troubled by the actual output voltage levels of the amplifier 13. A feed-back circuit is necessary to establish the required hysteresis between the battery voltage switching values during charge and during open circuit. Without the diode 16 it would be difficult to select fixed value components for the trigger circuit and a manual adjustment would have to be made after assembly.

The output from the battery voltage comparator 10 provides what may be termed an open-circuit command signal and is fed to the first input of a NOR gate 62, of which the second input is connected to an initial reset signal line 64 described in more detail below. This gate 62 also acts as an inverter to produce a charge command signal which is fed to a common-emitter amplifier 66 which drives the relay 50. Thus when the output of the battery voltage comparator 10 (the open-circuit command signal) is low the charge command signal will be high, the transistor 66 will energize the relay 50, the contactor 40 will be energized and the charging current will be switched on.

Actually, to introduce delay, the open-circuit command signal is fed through an input resistor 68 and a diode 70 to the said first input, which is connected to the positive stabilised power line through a capacitor 72, and to the negative power line through a bias resistor 74. The time constant presented by the input resistor 68 and the capacitor 72 causes a delay of some 10 milli-seconds before the open-circuit command signal (through the charge command signal) can affect the contactor 40. Thus changes of less than 10 milliseconds in the open-circuit command signal have no effect. The trigger pulse from the charge timer 32 to the battery voltage comparator 10 is only 10 microseconds in duration, and thus is insufficient in itself to affect the contactor 40. The latter is only opened if the battery voltage is above 2.3 v.p.c. when the voltage comparator trigger circuit 10 can latch into its other stable state by virtue of the feedback circuit.

When the gate 62 has turned off, the contactor 40 cannot pick up again until the time constant represented by the capacitor 72 and the bias resistor 74 has elapsed. This is much longer than the time constant of the capacitor 72 and input resistor 68, for example it may be about a second.

Initial Delay Circuit

To give an initial delay when the battery 26 is first connected a resistor capacitor network 76, 78 is connected across the stabilised power supply.

The capacitor 76 is connected to an inverter 79 to give an initial reset signal on the line 64. Thus when the battery 26 is first connected the capacitor 76 of the initial delay circuit will gradually charge up and after a predetermined delay will provide a sufficient voltage to switch off the initial reset signal. As already indicated this is applied to the NOR gate 62 so that the charge command signal will not be switched on until the initial reset signal has been switched off. This allows time for a battery connecting plug to be pushed fully home before the battery charging current can be switched on. The initial reset signal is also applied to the reset inputs of the counters 32, 33, 60, 80 and 81, so that these are set to zero when the battery 26 is first connected.

Master Oscillator

The master oscillator 30, which is shown in more detail in FIG. 3, consists of a programmable unijunction transistor 100 having its anode to cathode circuit connected across the capacitor 102 of a resistor capacitor network 102, 104 connected across the stabilised d.c. voltage supply (which, as already indicated, is fed from the battery). The gate of the programmable unijunction transistor is connected to the cathode of a diode 106 having its anode connected to the junction 111 of a potential divider 108, 110 connected across the supply, the junction 111 representing the output of the master oscillator. Accordingly the voltage across the capacitor 102 builds up until it equals that across the gate and cathode (which is shunted by a resistor 112) whereupon the transistor 100 fires and virtually short circuits the output signal for a short pulse at the same time discharging the capacitor 102 so that the cycle will be repeated.

The junction 113 of the input resistor-capacitor network, which may be referred to as the input point, is also fed from certain other circuits which will be described below and which serve to modify the frequency of the master oscillator. This is nominally two cycle per second in the absence of any such modification.

The output 111 from the master oscillator 30 is fed to two NOR gates 36, 77. The NOR gate 36 feeds the charge period counter 32, and has its second input fed with the open circuit command signal from the comparator 10, which signal is low during charging intervals, so allowing the pulses to be fed to the charge period counter.

The Charge Period Counter

The charge period counter consists of an 11 stage binary counter 32, the output of which is connected to a single stage binary counter 33. In fact, the two counters 32, 33 all form part of a single 14 stage integrated circuit binary counter, but they are shown separately for convenience. The output of the counter 32 is connected to the capacitor 34 to deliver the negative pulses to the comparator 10. Accordingly during a charging period pulses at about 2 per second will be directed by the NOR gate 36 to the charge period counter which will count them on the binary system. Hence after about 512 seconds the output of the counter 32 will go high and deliver a positive pulse to the inverting input of the battery voltage comparator 10, but this has no effect. After a further 512 seconds it will go low again and this time deliver a negative pulse to the inverting input of the voltage comparator 10 which has the effect of momentarily switching it on as already described.

The Open Circuit Counter

The open circuit counter 60 is fed from the master oscillator 30 with pulses at about ½ second intervals through the NOR gate 77, which has 2 further inputs. One of these inputs is supplied with the charging command signal from the gate 62, so that the pulses cannot reach the open circuit counter 60 during charging periods, but only during open-circuit intervals, whilst the other is connected to a maximum/minimum count signal line 75 from the open circuit counter 60 so as to inhibit pulses when the counter reaches zero on a down count or its maximum count on an up count. Thus when the counter reaches the limit of its count it refuses to accept any further pulses until the counting direction is changed.

The open-circuit counter 60 is also provided with an up-down input 73 connected to the output of the counter 33. Thus at the end of one charging interval, when the output of the charge period counter 32 goes low, the output of the counter 33 will go high and this switches the open circuit counter 60 to an up count. At the end of the next charging period when the output of the counter 32 goes low the output of the counter 33 also goes low so that on this occasion it switches the open circuit counter 60 to a down count. During the charging cycle intervening between the two open circuit intervals the input to the open circuit interval counter 60 will have been suppressed by the NOR gate 77 and the count built up during the first of the two open circuit intervals will be stored.

The output of the counter 33 is also connected through a line 35, one or more resistors 114 and a diode 116 to the input point 113 of the master oscillator 30, so that when this output is high it virtually shunts the resistor 104 of the resistor capacitor input of the master oscillator, causing the pulses to be speeded up by nominally 5 percent. Thus the count up in an odd open-circuit interval is 5 percent faster than the count down in an ensuing even open-circuit interval.

Accordingly if the duration of the even open circuit interval is more than 105 percent of that of the previous odd open-circuit interval the open circuit counter 60 returns to zero and gives the zero count signal.

The initial reset is not applied direct to the open circuit counter but is supplied to one input of an OR gate 71 to the other input of which the output of counter 33 is applied through a differentiating capacitor resistor network 69. The output of the OR gate 71 is applied to the reset input of the open circuit interval counter 60 to reset this counter to zero. Thus a high spike resets the counter each time the charge period timer 33 signals a change to an up count.

FIG. 4 shows the circuit of the open-circuit interval counter in greater detail. The counter consists of three 4-bit counter stages 150, 152, and 154. The input pulses are supplied directly to the input of the first stage 150, and through AND gates 156 and 158 respectively to the inputs of the second and third stages 152 and 154. The other input of each of the AND gates 156 and 158 is connected, through a differentiating resistor-capacitor network 160 or 162, to the maximum/minimum count output of the preceding stage 150 or 152. Thus the second inputs to the gates 156 and 158 are normally low, and no pulses are supplied to the stages 152 and 154, but when the stage 150 passes its maximum count (15) on an up count, or its minimum count (0) on a down count, a positive pulse is supplied to the gate 156, and causes the count of the stage 152 to change by 1. Carrying and borrowing between the stages 152 and 154 occurs in a similar manner.

The maximum/minimum count outputs of the three stages are also supplied to the inputs of a NOR gate 164 whose output forms the maximum/minimum count line 75. The reset input to the counter 60 is connected to all three preset enable inputs; the data inputs of the stages are all connected to battery negative, so that the counter can be reset to zero.

The Double Chance Counter

As indicated above the arrangement is designed so that the main phase of the charge will not be terminated on the first occasion when a zero count signal is not given during an even open circuit interval but only on the second occasion. For this purpose the zero count signal from the output 75 of the open-circuit counter 60 is fed to a NOR gate 82 together with the open-circuit command signal from the comparator 10 and the output of the charge period counter 33. Accordingly this NOR gate will produce a signal when the count is not zero during the charging interval following an even open-circuit interval. The output of the NOR gate 82 is passed through a resistor-capacitor delay network 84 to one input of an AND gate 86, the output of which is applied to the control input of the double chance counter which consists of two stages 80 and 81. The other input of the AND gate 86 is connected, through a resistor-capacitor delay network 88, to the inverted output of the second stage 81 of the counter. Accordingly on the first occasion on which the count does not return to zero at the end of the down count, the double chance counter will count up to 1, and on the second occasion it will count up to 2 giving a high output on a second stage output and a low output on a second stage inverted output. This disables the AND gate 86 so that no further counting is possible.

The two outputs serve to terminate the main phase of the charge and to initiate phase 3. In the first place they are applied respectively to two Darlington pairs each controlling an indicating light 90, 91 indicating respectively phase 2 and phase 3 of the charge. In addition the uninverted output is connected through a line 83, a resistor 38 and a diode 39 to the input point 113 of the master oscillator 30, so as to increase its frequency in the ratio of about 1 to 8, and thereby reduce the charge periods from about 17 minutes to about 2 minutes each. In addition the inverted second stage output of the double chance counter is connected through a diode 28 and a resistor 29 to the inverting input of the amplifier 12 of the battery voltage comparator 10.

The effect of this is to reduce from 2.3 volts per cell to 2.18 volts per cell the threshold voltage of the battery 26 at which an open circuit interval is terminated and the charging current is switched on again. Accordingly in phase 3 the charging periods are much shorter and the open circuit intervals are much longer and this regime can safely be continued virtually indefinitely without damage to the battery.

Maximum Count Control

In certain circumstances it is possible that the functioning of the apparatus as so far described may fail, due to the fact that the open circuit interval counter 60 reaches its maximum count. Rather than providing an inordinately large counter it is considered more economical to make provision that if the open circuit interval exceeds a certain duration, 34 minutes in this example, the double chance counter will respond and change over to phase 3. Without this provision if an odd open circuit interval exceeds 34 minutes the counter will reach its maximum count, and, as already described, would not accept any further pulses. Hence even if the ensuing even open circuit interval were no longer than the preceding odd open circuit interval, it would return the counter to zero so as to inhibit the NOR gate 82 and prevent an input to the double chance counter.

The second phase of the charge would thus continue indefinitely.

Accordingly the zero count output 75 which in fact means zero or maximum count of the counter 60 and the output from the counter 33, are applied to a NAND gate 92 from which the output is fed through a common-emitter amplifier 94 to the set input of the second stage 81 of the double chance counter, which, when it receives a signal, directly sets the second stage output of that counter to high and the inverted second stage output to low.

Accordingly when counting up during an odd open circuit interval the output of the counter 33 is high and until the maximum count is reached the zero count output 75 is low so that the NAND gate gives an output, the amplifier 94 conducts, and there is no input to the set input of the double chance counter. On the other hand if during the up count the open circuit counter 60 reaches its maximum count both the output of the counter 33 and the zero count output (or maximum count output) 75 become high so that the NAND gate gives no output and an output is fed to the set input of the double chance counter, which sets its second stage 81 thereby giving an output from its second stage output and no output from its inverted second stage output.

Accordingly if the open circuit interval counter 60 ever reaches its maximum count before the end of an odd open circuit interval (when it is counting upwards) the double chance counter will respond and change over from phase 2 to phase 3 irrespective of whether the open circuit interval counter gets back to zero before the end of the even open circuit intervals.

Automatic Shut Down

Provision is also made for switching off the charger if the battery 26 should be disconnected during a charging interval. Hitherto reliance has been placed on a transient spike which occurs when the battery is disconnected from the charger and the output of the latter rises to about 3.2 volts. Unfortunately if the battery is connected through long cables a voltage of this sort may be reached on charge. It has also been proposed to use an auxiliary transformer in order to inject a higher voltage in these circumstances but the present arrangement incorporates a considerably simpler device employing a voltage doubler circuit.

For this purpose a capacitor 200 and a diode 202 are connected in series between the a.c. input terminals of the main charger rectifier 46, and their junction is connected through a resistor 204 to the positive charging terminal. Thus when the battery 26 is disconnected a voltage equivalent to some 3.7 volts per cell is applied to the charging terminals 48 and a corresponding high voltage is applied to the battery voltage comparator 10 causing the open circuit command signal to go high. As already indicated this output is connected through the resistor 68 and the diode 70 to one input of the NOR gate 62 whence the output is the charge command signal. This same input to the NOR gate 62 is connected to the positive supply terminal through the capacitor 72 and to the negative supply terminal through the resistor 74. The establishment of the open circuit command signal rapidly discharges this capacitor and supplies an input to the NOR gate 62 so that the charge command signal is cut off and the charging current is interrupted. Since the power supply for the control circuit is drawn from the charging terminals 48, the stabilised voltage now falls to zero at a rate controlled by the smoothing capacitors. Thus the comparator 10 is still active for a short period after the battery 26 has been removed, and detects that the voltage across the terminals has fallen below the threshold. Accordingly, the output of the comparator 10 goes low. Normally this would result in a charge command signal at the output of the gate 62, but the delay imposed by the capacitor 72 and the resistor 74 is so long that before this can occur the stabilised voltage has fallen to zero. Thus chattering of the contactor 40 is avoided.

The various logic devices referred to are of the known integrated circuit type giving high noise immunity and very reliable operation, such as RCA C/-MOS.

What we claim as our invention and desire to secure by Letters Patent is:

1. Automatic electric battery charging apparatus comprising: means for temporarily interrupting the charging current during open-circuit intervals, the duration of each open-circuit interval depending on the fall of battery voltage during such interval, and means for terminating at least a phase of the charge of the charging circuit when the ratio of the duration of an open-circuit interval to that of a preceding open-circuit interval is below a predetermined value for more than one pair of successive open-circuit intervals.

2. Apparatus as claimed in claim 1 further comprising: means for supplying pulses at one frequency and at a slightly lower frequency respectively during odd and even successive open-circuit intervals, and counting means for comparing the number of pulses in the respective intervals and terminating at least a phase of the charge if the number in the even interval falls short of that in the odd interval.

3. Apparatus as claimed in claim 2 in which said counting means includes a semi-conductor binary digital counter.

4. Apparatus as claimed in claim 2 in which said counting means includes a single counter utilized for both odd and even open-circuit intervals.

5. Apparatus as claimed in claim 2 further comprising a charge time counter for determining the duration of the charging periods between the open-circuit intervals, said charge time counter being supplied with pulses from said means for supplying pulses.

6. Apparatus as claimed in claim 2 further comprising a second counter for registering the number of occasions that the ratio of the duration of an open-circuit interval to that of a preceding open-circuit interval is below a predetermined value.

7. Apparatus as claimed in claim 6 in which said second counter is a semi-conductor binary digital counter.

8. Apparatus as claimed in claim 1 in which said means for temporarily interrupting includes a signal level-responsive circuit comprising a trigger circuit having an output assuming one state when the input signal to said trigger circuit is below a lower threshold, and said output assumes another state when the input signal is above an upper threshold, and is bistable when the input signal is between the thresholds.

9. Apparatus as claimed in claim 8 in which said level-responsive circuit further comprises pulse means for applying to the input of said trigger circuit pulses of sufficient amplitude to ensure that said output assumes a predetermined state for the duration of the pulse, whereby the state of said output immediately after a pulse depends on whether the input signal is above or below a single one of the thresholds.

10. Apparatus as claimed in claim 9 in which said means for temporarily interrupting includes a controllable circuit controlled by the output of said level-responsive circuit, the duration of the pulses from said pulse means being substantially less than the operating time of said controllable circuit, so that said controllable circuit does not respond in the time taken by said trigger circuit to change state and revert to its previous state.

11. Apparatus as claimed in claim 8 in which said trigger circuit includes a differential amplifier having a resistive positive feedback path including a series diode so that feedback current can flow in only one direction and variation of said resistive feedback path affects only one of said threshold values.

12. Apparatus as claimed in claim 11 in which said differential amplifier is an operational amplifier.

13. Apparatus as claimed in claim 1 further comprising: a main rectifier having its input connected to an A.C. supply and its output connected to charger terminals to which a battery is connected to be charged; voltage responsive means for switching off the A.C. supply to said main rectifier when the voltage between the charger terminals exceeds a predetermined value; and a voltage doubler circuit connected to the input of said main rectifier and through an impedance to the battery terminals to produce across the latter an increased voltage and switch off said A.C. supply when the battery is disconnected from said charger terminals.

14. Apparatus as claimed in claim 13 in which said voltage doubler comprises a diode and a capacitor connected in series across the main rectifier input, and the junction of said diode and capacitor is connected through a resistor to one of the charger terminals.

* * * * *

UNITED STATES PATENT OFFICE
CERTIFICATE OF CORRECTION

PATENT NO. : 3,895,282
DATED : July 15, 1975
INVENTOR(S) : George W. Foster et al It is certified that error appears in the above-identified patent and that said Letters Patent are hereby corrected as shown below:

[30] Foreign Application Priority Date

December 29, 1972  Great Britain  No. 60062/72

Signed and Sealed this twenty-eight Day of October 1975

[SEAL]

Attest:

RUTH C. MASON
Attesting Officer

C. MARSHALL DANN
Commissioner of Patents and Trademarks